June 27, 1950  A. H. LAMB  2,513,184
SEALED ADJUSTER FOR ELECTRICAL
MEASURING INSTRUMENTS
Filed Dec. 10, 1946

Inventor:
Anthony H. Lamb,
By: Pierce, Scheffler & Parker,
Attorneys.

Patented June 27, 1950

2,513,184

UNITED STATES PATENT OFFICE 2,513,184

SEALED ADJUSTER FOR ELECTRICAL MEASURING INSTRUMENTS

Anthony H. Lamb, Hillside, N. J., assignor to Weston Electrical Instrument Corporation, Newark, N. J., a corporation of New Jersey Application December 10, 1946, Serial No. 715,223

1 Claim. (Cl. 286—29)

This invention relates to hermetically sealed instruments and in particular to those of the electrical measuring type.

Where instruments of the class described, especially those in which the mechanism is quite delicate, are to be used in high humidity climates, or in places where the surrounding air is heavily laden with injurious chemicals or gases or dust, or where the instrument will be exposed to the weather, it is desirable that the mechanism be hermetically sealed within its enclosing casing.

The general object of this invention is to provide an improved construction for hermetically sealing the zero corrector device that is used for adjusting the moving system of the instrument mechanism. Another object is to provide a sealed zero corrector device which may be adjusted when necessary without breaking the hermetic seal.

A more specific object is to provide a sealed zero corrector device for electrical measuring instruments in which the movable element of the corrector is hermetically sealed by a bellows unit that is secured to the underface of the instrument casing and which permits the element to be adjusted as may be necessary from the outside of the casing without breaking the hermetic seal between the interior of the casing and the surrounding air.

Figure 1:
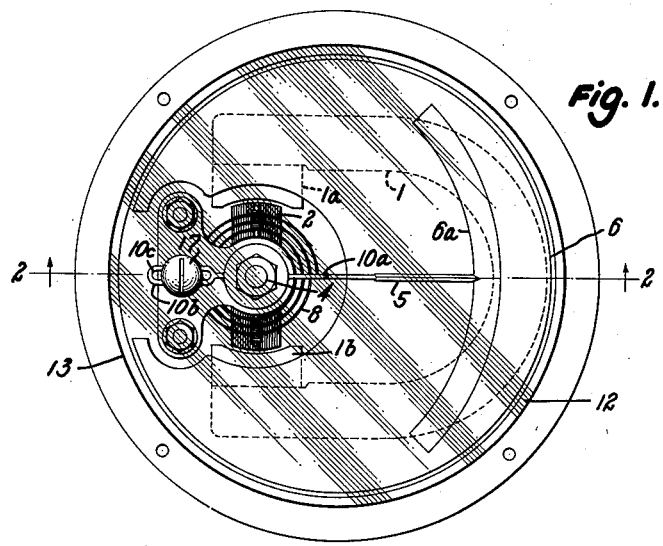
Figure 2:
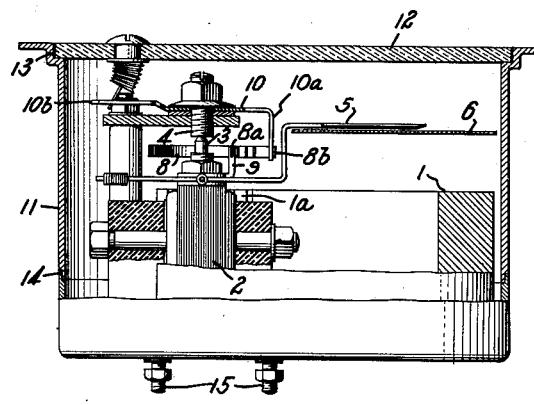
Figure 3:
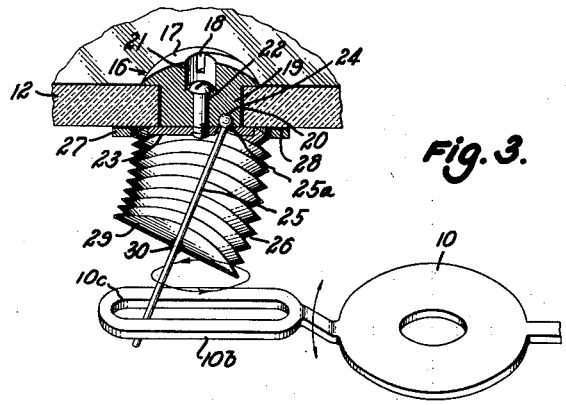

The foregoing and other objects and advantages to be derived from the invention will become apparent from the following detailed description when considered with the accompanying drawings which illustrate a preferred form of construction. In the drawings, Fig. 1 is a top plan view of one type of instrument embodying the invention, the view being drawn to a scale somewhat larger than actual size in order to clearly show the structural details; Fig. 2 is essentially a central vertical section taken on line 2—2 of Fig. 1 with the lower part of the instrument casing shown in elevation; and Fig. 3 is an enlarged sectional detail of the sealed part of the zero corrector mechanism.

Referring now to the drawing, the instrument mechanism shown is conventional, being of the permanent magnet-moving coil type that includes a generally C-shaped permanent magnet 1 having poles 1a, 1b between which is mounted a coil 2 that rotates through an angle which varies with the magnitude of the coil current. The coil 2 is carried by upper and lower axially aligned staffs that are received in adjustable jewelled bearings. In the interest of simplifying the drawings, only the upper staff 3 and its associated bearing 4 have been shown. An offset pointer 5 fixed to the upper staff 3 moves over a graduated scale 6a on scale plate 6.

For returning the coil and pointer to zero indication on the scale plate when the coil current is zero, a spiral spring 8 is provided. The inner end 8a of this spring is secured to an upwardly extending tab on a disc 9 which is secured fast to the staff 3, and the outer end 8b of spring 8 is connected to a downwardly turned tongue 10a of a spring abutment 10 which is carried by bearing 4 for limited rotation about the bearing axis. Abutment 10 is also provided with a lateral extension 10b that contains an elongated slot 10c.

The mechanism of the instrument so far described is conventional and is mounted within an enclosing casing 11 preferably of metal that is closed at the upper end by a transparent cover plate 12 hermetically sealed to the rim of the casing by a ring 13 of solder. If desired, casing 11 may be made in two sections hermetically sealed together in a lap joint 14. The electrical connections to the coil 2 may be taken into casing 11 through terminal studs 15 which are hermetically sealed at their points of entry through the lower end wall of the casing.

Referring now to Fig. 3 in particular, the zero corrector for the coil 2 is comprised of a metal stud 16, preferably of brass, having a head 17 slotted at 18 for receiving a screw driver, and a shank 19 which extends through an aperture 20 in cover plate 12, the aperture 20 being of substantially the same diameter as the stud shank 19 so as to form a bearing surface for the latter. The stud shank contains an axial bore 21 for receiving a machine screw 22 by which a circular plate 23 is fastened to the lower end face of the stud shank and bears against the underface of cover plate 12 to thereby hold the stud firmly in place.

A substantially hemispherical socket 24 offset from the stud axis is provided in the end face of the stud shank 19 for receiving the balled upper end 25a of a pin 25. This pin passes downwardly through a conical opening in plate 23 and through a tubular yieldable member 26, impervious to gas, into the slot 10c in the extension of disc 10. Preferably, the yieldable member 26 is constituted by a metallic bellows which has a diameter slightly larger than that of plate 23, and which is sealed at its upper open end to a metallic ring 27, the latter being sealed in place to the underface of cover plate 12 around the opening 20 by a ring of solder 28. A rigid end plate 29 which closes the lower end of the bellows unit contains a central opening through which the pin 25 passes and the latter is secured and sealed to plate 29 at this point by solder 30.

Pin 25 is fixed perpendicularly to end plate 29 and hence for any given position of the offset balled end 25a about the stud axis, one side of the bellows 26 will always be expanded and the side diametrically opposite thereto correspondingly contracted. Thus, end plate 29 always occupies a position at an angle to the stud axis extended, and the lower free end of the bellows will travel in an arcuate path as the stud 16 is rotated.

The operation of the zero corrector mechanism should be apparent from Fig. 3. Pointer 5 is adjusted to zero indication on the graduated scale 6a with the aid of a screw driver inserted in the slotted stud head. As the stud is turned, the lower end of the bellows executes a rotary movement and guides the lower end of pin 25 along an arcuate path, as shown by the arrows, about an axis which coincides with the stud axis, which motion is transmitted through the pin and slot connection into a corresponding rotary movement of spring abutment 10 about the axis of staff 3. As abutment 10 rotates, it carries the outer end of spring 8 with it and a corresponding turning movement of staff 3, coil 2 and pointer 5 ensues as the inner end of spring 8 follows its outer end.

It should now be evident that the bellows unit 26 not only effectively seals off the interior of casing 11 from the stud opening 20 in cover plate 12 but also permits the zero corrector to be adjusted whenever necessary without disturbing the seal. Some moisture or dust may pass into the bellows 26 through the narrow annular space which must be left between the stud shank 19 and the wall of the cover plate in order that the stud may be turned to make an adjustment of the zero corrector, but any such moisture or dust will be safely trapped within the bellows since the interior of the latter is sealed off at both its top and bottom from the interior of the casing.

In conclusion, it will be understood that the principles underlying the invention may be applied to types of electrical measuring instruments other than the particular type illustrated and also that various changes in the construction and arrangement of parts of the illustrated embodiment may be made without departing from the spirit and scope of the invention as defined in the appended claim.

I claim:

A sealed zero corrector for the moving system of a hermetically sealed electrical measuring instrument comprising, a rotatable adjustment stud the shank of which is seated in an opening in the cover of the instrument casing and the head of which bears against the outer face of said cover at the marginal portions adjacent the opening, an anchor plate bearing against the inner face of said cover at said opening, an anchor member seated in an opening through said stud and interlockingly engaging the said anchor plate for securing said anchor plate to said stud, an impervious tube closed at one end and sealed at the other end to the inner face of said cover at the marginal surface surrounding said opening, a pin extending through and secured intermediate its ends to the closed end of said tube, means connecting the upper end of said pin to said stud at a point offset from the stud axis, and means actuated by the lower end of said pin to effect an adjustment of the instrument's moving system.

ANTHONY H. LAMB.

REFERENCES CITED

The following references are of record in the file of this patent:

UNITED STATES PATENTS

| Number | Name | Date |
|---|---|---|
| 1,378,118 | Jacobsen et al. | May 17, 1921 |
| 1,702,762 | Brubaker | Feb. 19, 1929 |

FOREIGN PATENTS

| Number | Country | Date |
|---|---|---|
| 555,879 | Great Britain | of 1943 |